United States Patent [19]

Lee et al.

[11] 4,281,540
[45] Aug. 4, 1981

[54] LOW TURBULENCE WIND TUNNEL STILLING CHAMBER

[75] Inventors: Roland E. Lee, Beltsville; Alfred G. Berger, Colesville, both of Md.; Dennis A. Sowers, Hermosa Beach, Calif.; Richard J. Sergeant, Torrance, Calif.; Hermann W. Behrens, Rancho Palos Verdes, Calif.

[73] Assignee: The United States of America as represented by the Secretary of the Navy, Washington, D.C.

[21] Appl. No.: 844,689

[22] Filed: Oct. 25, 1977

[51] Int. Cl.³ .............................................. G01M 9/00
[52] U.S. Cl. .................................. 73/147; 73/432 L; 138/92
[58] Field of Search ................. 73/147, 432 L; 138/92

[56] References Cited

U.S. PATENT DOCUMENTS

| | | | |
|---|---|---|---|
| 2,805,571 | 9/1957 | Graham | 73/147 |
| 2,914,941 | 12/1959 | Frenzl | 73/147 |
| 2,968,944 | 1/1961 | Manoni | 73/147 |
| 2,992,557 | 7/1961 | Bosse | 73/147 |
| 3,111,843 | 11/1963 | Fredette | 73/147 |
| 3,403,227 | 9/1968 | Way et al. | 73/147X |
| 3,478,583 | 11/1969 | Barr, Jr. et al. | 73/147 |
| 3,817,082 | 6/1974 | Fletcher et al. | 73/147 X |

*Primary Examiner*—Nelson Moskowitz
*Attorney, Agent, or Firm*—R. S. Sciascia; Sol Sheinbein; Bill Anderson

[57] ABSTRACT

A wind tunnel in which high energy laser beam impingement studies can be conducted such that beam distortion and degradation is substantially precluded. Uniform, low turbulence flow in which thermal blooming, creation of wakes is substantially eliminated is attained by providing an improved elongated cylindrical settling chamber having a gradual turning radius. A transverse aerodynamic window is located in the low velocity flow turning region of the settling chamber which allows the entry of the laser beam and the exhaust of a turbulent sonic free-jet constituting 10 percent of the total fluid flow through the wind tunnel.

10 Claims, 3 Drawing Figures

LOW TURBULENCE WIND TUNNEL STILLING CHAMBER

BACKGROUND OF THE INVENTION

The present invention relates generally to wind tunnels and more particularly to a wind tunnel adapted to simulate reasonably accurately the head-on interaction of a high power laser beam and an object moving in the atmosphere.

Wind tunnels or air flow test stands are generally used for aerodynamically simulating flight conditions, e.g., aerodynamic flow fields and shear loads on the frontal regions of test vehicles or models. In special applications of these test stands it is intended to provide, e.g., an aerodynamic sea level environment with subsonic and supersonic test stream velocities in which target models are subjected to a frontal illumination with a high energy laser beam. The laser studies are important, e.g., in determining the lethal and vulnerability effects of laser beam impingement on aerodynamic vehicles and accompanying electronics. However, it is imperative that beam distortion, thermal blooming and nonuniform flow with high turbulence are precluded in order to obtain useful experimental data.

In a conventional wind tunnel low turbulent uniform flow can be obtained through the use of a stilling or settling chamber. A settling chamber is a segment of the wind tunnel which normally consists of a large volume reservoir located immediately upstream of the testing region. Usually the desired flow characteristics are attained through an appropriate use of low turbulence screens, e.g., "egg-crate" or similar flow straighteners and settling chamber wall contouring; see for example U.S. Pat. NO. 2,805,571 to Graham and U.S. Pat. No. 3,403,277 to Way et al. The most practical and economical means of illuminating the frontal region of a test model with a laser beam appears to be to transmit the beam through the stilling chamber. An alternative is to bore an orifice or orifices in the inlet to the primary nozzle. This latter method however would be extremely expensive due to the high dimensional tolerances required. To provide a laser beam entrance opening downstream of a conventional stilling chamber would produce unacceptable air flow disturbances or would require an expensive mirror system to direct the laser beam. Finally, it should be remembered that in any provision of a laser beam entrance it is imperative to prevent beam distortion, thermal blooming and nonuniform flow with high turbulence.

SUMMARY OF THE INVENTION

It is therefore an object of the present invention to provide a new and improved settling chamber yielding minimum distortion and degradation of a laser beam impinging on a test model in a test section of a wind tunnel.

Another object of the present invention is to provide a method and a new and improved stilling chamber for a wind tunnel providing uniform low turbulence flow in the test section of the tunnel.

Still another object of the invention is to provide a new and improved settling chamber potentially having no vanes, screens or laser beam ducts.

A further object of the invention is to provide a method and apparatus for ensuring that flow speeds along and normal to the laser beam path are large enough to prevent thermal blooming of the flow in the beam path.

These and other objects of the invention are attained in a wind tunnel having an improved elongated curved settling chamber provided with a transverse aerodynamic window which allows a laser beam to enter the settling chamber far upstream of the wind tunnel's primary nozzle contraction section. The transverse aerodynamic window is located in the low velocity flow turning region of the settling chamber. A turbulent sonic free-jet is coaxial with the laser beam and the wind tunnel primary nozzle and provides approximately ten percent of the primary air flow through the wind tunnel.

BRIEF DESCRIPTION OF THE DRAWINGS

A more complete understanding of the invention and a fuller appreciation of the many attendant advantages, features and still other objects thereof will be readily derived by reference to the following detailed description when considered in connection with the accompanying drawings, wherein.

DESCRIPTION OF THE PREFERRED EMBODIMENTS

Figure 1:
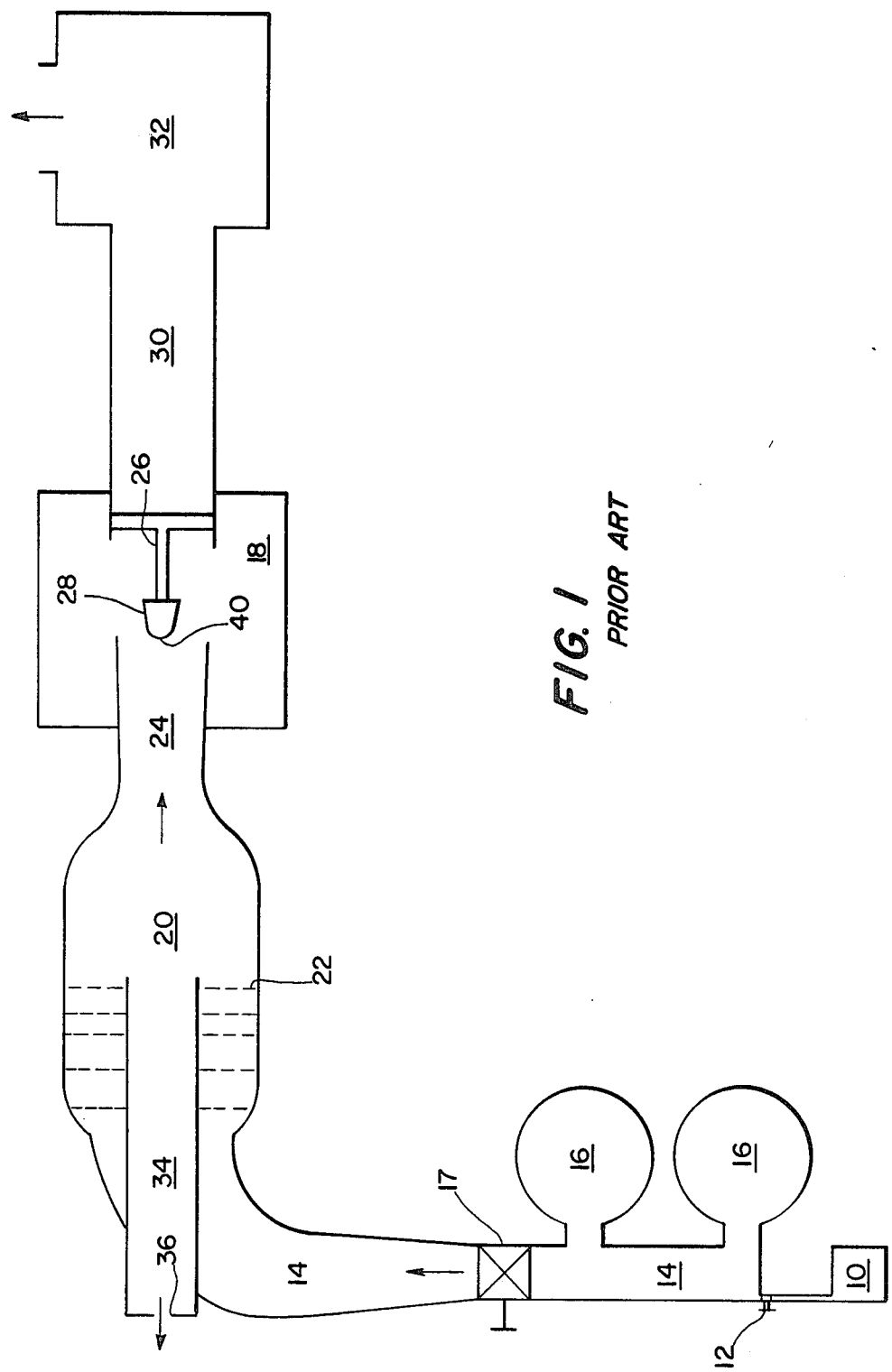
FIG. 1 is a schematic of a conventional wind tunnel modified in order to accomodate the entrance of a laser beam.

Referring now to the drawings wherein like reference characters designate identical or corresponding parts throughout the several views and more particularly to FIG. 1 thereof, wherein a conventional wind tunnel or air flow stand of the open-jet blow-down type air channel which may typically provide an aerodynamic sea level environment with subsonic and supersonic test stream velocities is shown. It is illustrated as a serial arrangement of a high pressure compressor 10 leading via a conventional cut-off valve 12 to a high pressure piping or manifold 14. Intersecting the manifold partially along its length are a plurality of fluid supply storage bottles 16 which are filled with air or some other fluid at elevated pressures.

Downstream of the last storage bottle, a control valve 17 is disposed in the manifold in order to control fluid flow through the air channel of the wind tunnel. Further downstream of the high pressure manifold and situated upstream of a test section or chamber 18 is a conventional settling or stilling tank or chamber 20. The settling chamber 20 consists of a large volume reservoir having an appropriate arrangement of low turbulence screens 22 juxtaposed in order to produce a low turbulent uniform flow throughout the test section 18. The screens could be of the "egg-crate" type or similar flow straighteners. Settling chamber wall contouring advantageously also ensures the attainment of the desired flow characteristics.

Interposed between the settling chamber 20 and the test section 18 is the primary nozzle 24. Nozzle 24 is designed for uniform parallel flow in the test section. Since for each Mach number a different nozzle is required, the nozzle must be flexible or the tunnel so arranged that alternative nozzles can be readily interchanged. Located within the test section, which may be of a free jet configuration operating at atmospheric pressures, is a model support 26 for securing a test model 28 within the test section 18. Of course, exhaust piping 30, silencing means 32 and flow monitor equipment, sensors, etc., (not shown) can be provided.

In order to subject target models 28 mounted on the model support to frontal illumination with a high energy laser beam in conventional tunnels, a beam entrance or aerodynamic window 34 shaped in the form of a tube might be placed within the settling chamber. The aerodynamic window is open to the atmosphere or relatively low pressure at its entrance 36 and subjected to the environs of the wind tunnel at its exit 38. This condition produces a "leaking" fluid flow out of the wind tunnel through the tube resulting in a certain percent loss of the net fluid flow through the wind tunnel. However, this design has several problem areas associated with it, e.g., the wake from around the beam entrance tube 34 could impinge onto the model stagnation, point, e.g., at 40. As the density of the flow field in the wake is not uniform a distortion of the laser beam can be created, e.g., beam jitter. With beam distortion more energy of the oncoming laser beam is lost tending to dissipate the effectiveness of the laser experiment.

A further problem is that of thermal blooming within the beam entrance tube. Thermal blooming is a phenomenon which occurs when air in the beam path experiences a significant temperature rise thereby causing density gradients throughout the flow field wherein its index of refraction would likewise be varying. Potentially 90 percent of the beam energy could be lost due to the transference of the laser beam's radiant energy to the flow field unless somewhat extensive corrective steps are taken. As can be seen this very deleterious effect also reduces the amount of usable data in an otherwise successful laser experiment.

It would be desirable therefore to move a wake produced by any aerodynamic window off axis of the stilling chamber such that the wake does not impinge onto the model stagnation point. A further desirable feature would be to have non-coaxial leaking flow through the beam entrance window as will be subsequently understood.

Figure 2:
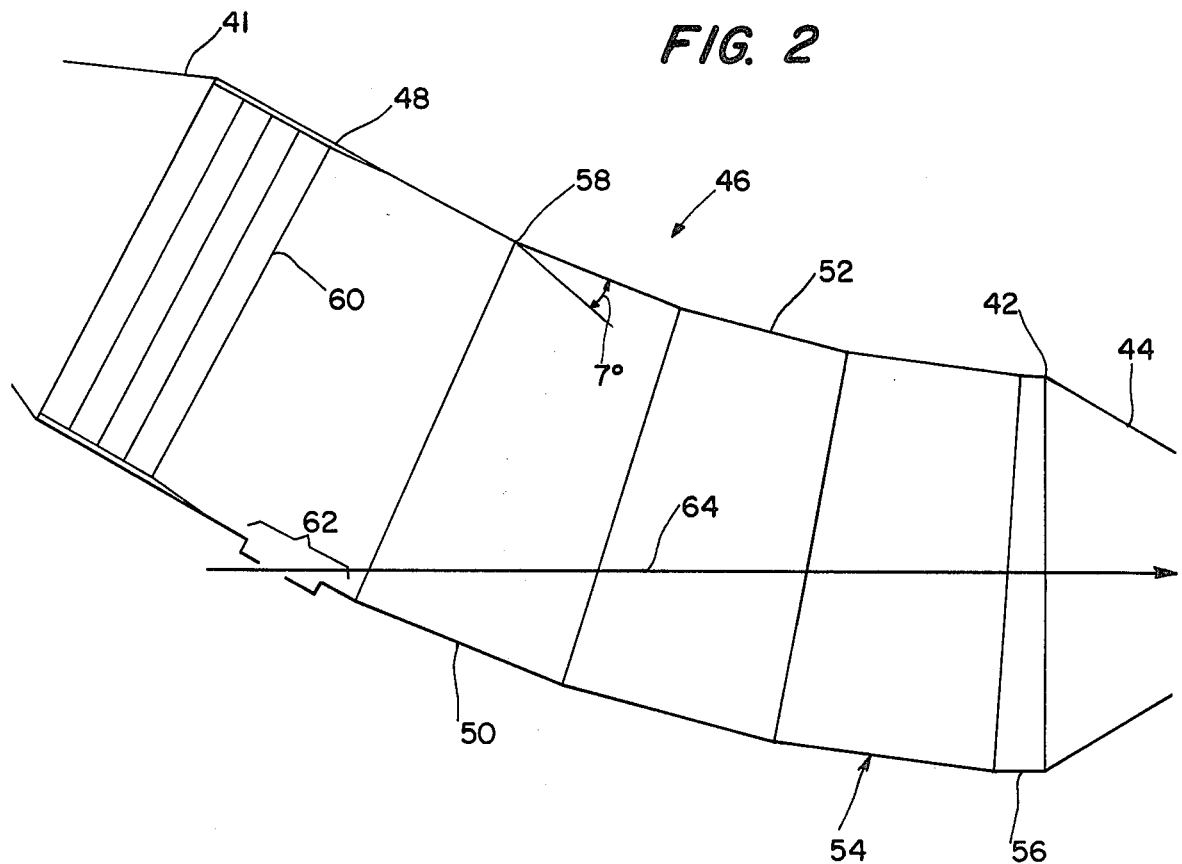
FIG. 2 illustrates the instant stilling chamber.

The stilling or settling chamber of the present invention, which can insure the prerequisite low turbulence flow for laser impingement studies, is shown in FIG. 2. It has a cylinder cross-section and an upstream section 41 which mates with the downstream side of the high pressure piping 14 and a downstream section 42 which mates with the converging inlet portion 44 of the primary nozzle 24. The upstream section 41 of the settling chamber 46 is shown as an expansion cone, of approximately 45 degrees, located just downstream of the control valve 17 and mated to a first tubular straight segment 48. The settling chamber 46, has an elongated gradual turning radius in order to permit the primary fluid flow to follow the turn without flow separation and thus the creation of strong vortices. The turning is approximated by the tubular straight segments 48, 50, 52, 54, 56 which have a mininum length, e.g., 0.5 diameter. Where the flow expands locally around a relatively sharp corner, as at 58, the expansion angle should preferably not exceed 7 degrees in the flow direction so as to reduce turbulence.

The curved elongated cylindrical settling chamber is somewhat banana shaped with its longitudinal axis curved approximately 28 degrees to the primary nozzle or laser beam axis which preferably are identical. Furthermore, the chamber also reduces turbulence in the provision of a contraction ratio preferably at least 12:1.

The contraction ratio is defined as the ratio of the area of the cross-section of the settling or stilling chamber to the minimum cross-section area of the primary nozzle. While the chamber has been shown as being formed with tubular straight segments, it is clear that it could be constructed as an integrally formed chamber.

If a high turbulence flow control valve is used at 17 it is necessary to utilize a plurality, e.g., four sets, of low turbulence screens 60 proximate the upstream section 40 of the stilling chamber. The screens should be spaced in series at least 200 wire diameters apart and with appropriate mesh spacing to provide a pressure drop coefficient of approximately 2.0 for each screen. However, if a low turbulence control valve is used at 17, as is preferable, then the low turbulence screens may be dispensed with.

A transverse aerodynamic window or laser beam entrance orifice 62 is located in the low velocity flow turning region of the settling chamber. Placement of the window is in the low velocity flow region since this location presents a lower potential for the creation of turbulence. A further factor is that since the velocity of the fluid stream is inversely proportional to the cross sectional area of the settling chamber, the larger the settling chamber the smaller the disturbance velocity. Also, the size of the aerodynamic window is fixed or determined by the desired diameter of the required laser beam. Thus, the smaller the orifice or window in a large setting chamber, the less the potential for flow disturbances.

Furthermore, any disturbances in the primary air flow which may be created due to the presence of the aerodynamic window 62, such as the turbulent shear layer which may exist at the edge of the aerodynamic window, are experienced substantially only in the boundary layer which is swept away in following the slowly curving elongated walls of the settling chamber. Finally, as with beam entrance tube 34, "leaking" flow exists through the window as a turbulent sonic free-jet. The free-jet which flows out of the tunnel through the beam entrance orifice 62 constitutes approximately ten percent of the total primary air flow through the wind tunnel. Any disturbances in the free-jet region is discharged thru the free-jet flow and not into the primary air flow.

A laser beam 64 enters the settling chamber 46 through the beam entrance orifice 62 along a line which is coaxial with the primary nozzle inlet or contraction section 44. This is important since due to the axisymmetrical fluid flow through the contraction section of the primary nozzle there are no substantial density gradients transverse to the fluid flow which would normally produce distortion of the laser beam. In other words, density gradients in the flow of the primary nozzle contraction section are along the beam path thus avoiding any untoward beam distribution. Degradation flow recirculating regions in the beam path are avoided altogether since there are no substantial wakes produced near the aerodynamic window. Also, the beam path length through the turbulent shear layer which exists at the edge of the aerodynamic window is minimized. The window shape and the fluid flow direction are responsible for these advantageous window properties.

Figure 3:
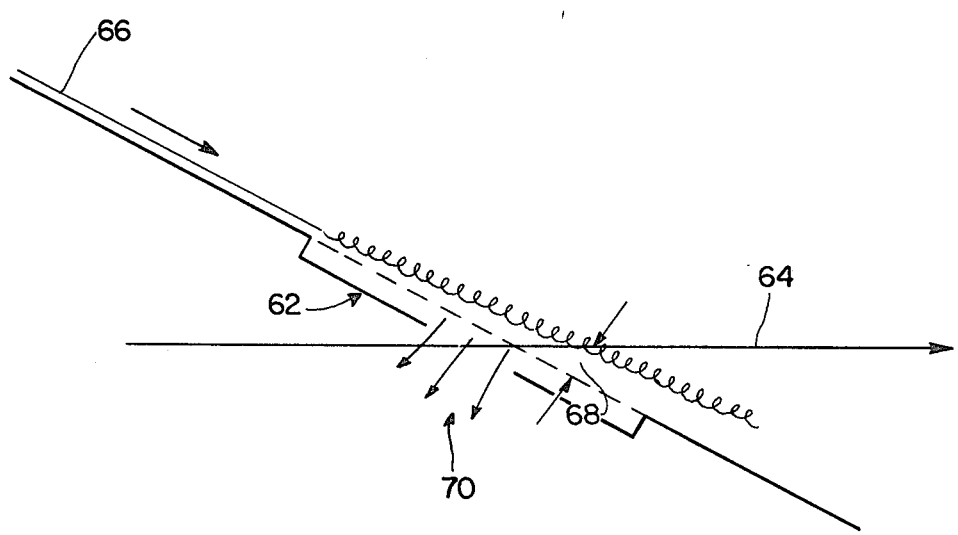
FIG. 3 shows the laser beam path through the fluid flow near the aerodynamic window.

As is seen from FIG. 3, which illustrates the effect of the presence of the window on the fluid flow any small flow disturbances are fairly restricted to the region of the boundary layer 66. As the laser beam passes through the turbulent shear layer 68, and the turbulent sonic free-jet 70, substantially no beam distribution or degradation takes place due to the minimization of the beam path length through the layer 68 and the fact that the boundary layer disturbances are swept away in the relatively thin boundary layer 66. Finally, flow speeds within the settling chamber 46, along and normal to the beam path, are large enough to prevent thermal blooming of the fluid flow within the beam path. As is readily understood the motion of a streamline moving across the path of the laser beam is such that a gas molecule is not exposed to a sufficient amount of laser radiant heat which could cause thermal blooming.

There is thus provided a wind tunnel in which laser beam impingement studies can be conducted without beam distortion or degradation. Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. A wind tunnel for high energy laser applications comprising:
    a test chamber for containing a model support, said model support being capable of fixing a test model to be subjected to illumination with a high energy laser beam, said test chamber being in fluid communication on its downstream side with fluid exhaust means and with a primary flow nozzle on its upstream side, said nozzle being in fluid communication on its upstream side with a means for providing a controllable source of fluid at elevated pressures to be supplied to said test chamber, wherein the improvement comprises:
    an improved curved elongated settling chamber interposed between said nozzle and said source of fluid at elevated pressure, said settling chamber having a gradual turning radius to permit the fluid flow through the tunnel to follow the turning of the settling chamber and prevent turbulence;
    a transverse aerodynamic window providing for the entrance of said laser beam, said window being located in the low velocity flow turning region of said settling chamber; and
    a turbulent sonic free-jet coincident with said window wherein fluid flow through said settling chamber is uniform and smooth allowing said laser beam to impinge on said test model without beam distortion or degradation.

2. A tunnel as in claim 1, wherein said means for providing a controllable source of fluid under elevated pressures comprises a flow control valve, said flow control valve being of the low turbulence type, whereby the necessity for flow straighteners within the settling chamber is obviated.

3. A tunnel as in claim 1, wherein said means for providing a controllable source of fluid under elevated pressures comprises a flow control valve, said flow control valve being of the high turbulence type; and
    a plurality of low turbulence screens are located in the upstream portion of said settling chamber serially spaced apart in order to reduce turbulence.

4. A tunnel as in claim 3, wherein said settling chamber has a conical expansion section just downstream of said control valve; and wherein
    said low turbulence screens being located immediately downstream of said expansion section, said low turbulence screens being spaced apart at least 200 wire diameters and provided with appropriate mesh spacing to provide a pressure drop coefficient of 2.0 for each screen.

5. A tunnel as in claim 2 wherein said settling chamber has a 45 degree conical expansion section immediately downstream of said flow control valve.

6. A tunnel as in claim 1 wherein said settling chamber has a contraction ratio of at least 12.1.

7. A tunnel as in claim 1 wherein said settling chamber gradual turning radius is approximately by tubular straight segments
    each of said segments being at least 0.5 times the tubular diameter in length.

8. A tunnel as in claim 7 wherein where the fluid flow expands locally around a sharp corner formed between said segments, the expansion angle does not exceed 7 degrees in the flow direction.

9. A tunnel as in claim 1 wherein the air flow of the turbulent sonic free-jet constitutes ten percent of the primary air flow through the wind tunnel.

10. A tunnel as in claim 1 wherein the longitudinal axis of said settling chamber is curved 28 degrees to said primary nozzle axis.

* * * * *